United States Patent [19]

Mitani et al.

[11] Patent Number: 5,184,224
[45] Date of Patent: Feb. 2, 1993

[54] TELEVISION PROJECTION SCREEN HAVING ANTI-STATIC ELEMENTS

[75] Inventors: Katsuaki Mitani; Toshiaki Matsumura; Noboru Yasumatsuya, all of Osaka, Japan

[73] Assignee: Matsushita Electric Industrial Co., Ltd., Osaka, Japan

[21] Appl. No.: 725,077

[22] Filed: Jul. 3, 1991

[30] Foreign Application Priority Data

Jul. 3, 1990 [JP] Japan .................... 2-176144

[51] Int. Cl.⁵ .............. H04N 5/74; H04N 5/64; H04N 5/72
[52] U.S. Cl. .................... 358/231; 359/507; 359/456; 361/212
[58] Field of Search .......... 358/60, 231, 237, 250-253; 361/212, 220; 359/507, 443, 450, 452, 453-457, 460; 353/69, 74, 75, 20; 313/313, 479, 478, 477 R

[56] References Cited

U.S. PATENT DOCUMENTS 3,279,314 10/1966 Miller
4,856,101 8/1989 Jonsson et al. ............ 358/253 X
5,066,099 11/1991 Yoshida et al. ............ 359/457

FOREIGN PATENT DOCUMENTS

0283128 9/1988 European Pat. Off.
301118 2/1989 European Pat. Off.
0371432 6/1990 European Pat. Off.
0372827 6/1990 European Pat. Off.
57-68980 4/1982 Japan .................... 358/231
57-204686 12/1982 Japan .................... 358/237
2-94784 4/1990 Japan.

Primary Examiner—James J. Groody
Assistant Examiner—Mark R. Powell
Attorney, Agent, or Firm—Lowe, Price, LeBlanc & Becker

[57] ABSTRACT

A transmission-type video projection television system employs a transmission-type screen for displaying an image projected from a rear projector for visual observation by an observer in front of the screen. The transmission-type screen has Fresnel and lenticular lenses, one of which has an electrically conductive layer or a metal member on its surface to prevent the lens from being electrostatically charged, so that dust or dirt particles will not be attracted to the screen.

19 Claims, 11 Drawing Sheets

| SCREEN | CONDITIONS FOR ANTISTATIC TREATMENT ||||||||| |
|---|---|---|---|---|---|---|---|---|---|
| | LENS SURFACES |||| RESISTANCE OF PROCESSED SURFACES (Ω) |||| STRIPES | GROUNDED |
| | (a) | (b) | (c) | (d) | (a) | (b) | (c) | (d) | COUPLED | |
| α | NO ANTISTATIC TREATMENT | NO ANTISTATIC TREATMENT | NO ANTISTATIC TREATMENT | NO ANTISTATIC TREATMENT | $1.4 \times 10^{11}$ | $3.5 \times 10^{11}$ | $1.4 \times 10^{11}$ | $1.4 \times 10^{11}$ | NO | NO |
| β | PROCESSED FOR ANTISTATIC TREATMENT | NO ANTISTATIC TREATMENT | NO ANTISTATIC TREATMENT | NO ANTISTATIC TREATMENT | X: $0.8 \times 10^{11}$ Y: $2.2 \times 10^{4}$ | $4.2 \times 10^{10}$ | $1.2 \times 10^{11}$ | $1.2 \times 10^{11}$ | NO | NO |
| γ | NO ANTISTATIC TREATMENT | NO ANTISTATIC TREATMENT | PROCESSED FOR ANTISTATIC TREATMENT | NO ANTISTATIC TREATMENT | $1.4 \times 10^{11}$ | $3.5 \times 10^{11}$ | $1.8 \times 10^{11}$ | $1.4 \times 10^{11}$ | NO | NO |
| | PROCESSED FOR ANTISTATIC TREATMENT | NO ANTISTATIC TREATMENT | NO ANTISTATIC TREATMENT | NO ANTISTATIC TREATMENT | X: $8 \times 10^{10}$ Y: $2.2 \times 10^{4}$ | $4.2 \times 10^{10}$ | $1.2 \times 10^{11}$ | $1.2 \times 10^{11}$ | YES | NO |
| ε | PROCESSED FOR ANTISTATIC TREATMENT | NO ANTISTATIC TREATMENT | NO ANTISTATIC TREATMENT | NO ANTISTATIC TREATMENT | X: $5 \times 10^{5}$ Y: $2.2 \times 10^{4}$ (*) | — (*) | — (*) | $1.2 \times 10^{11}$ (*) | YES | YES |

α: CONVENTIONAL SCREEN  β: SCREEN OF 1ST EMBODIMENT
γ: SCREEN OF 2ND EMBODIMENT  ε: SCREEN OF 8TH EMBODIMENT
*: MEASURED WITH TWO LENSES COMBINED

FIG. 18B

| SCREEN | ELECTROSTATIC POTENTIAL | | | |
|---|---|---|---|---|
| | SURFACE (a) RUBBED | | SURFACE (d) RUBBED | |
| | SURFACE (a) | SURFACE (b) | SURFACE (c) | SURFACE (d) |
| α | 10 KV | 10 KV | 30 KV | 30 KV |
| β | 0 V | 0 V | 0 V | 8 KV |
| γ | 500 V | 250 V | 1 KV | 3 KV |
| ε | 0 V () | 0 V () | 0 V () | 3 KV () |
| | 0 V (*) | 0 V (*) | 0 V (*) | 1 KV (*) |

** : CENTRAL REGION MEASURED

***: OUTER PERIPHERAL REGION MEASURED

FIG. 19

TELEVISION PROJECTION SCREEN HAVING ANTI-STATIC ELEMENTS

BACKGROUND OF THE INVENTION

1. Field of the Invention

The present invention relates to a transmission-type screen and a transmission-type video projection television system which employs such a transmission-type screen for displaying an image projected from a rear projector for visual observation by an observer in front of the screen, and more particularly to an uncharged transmission-type screen which has an electrically conductive surface to prevent the screen from being electrostatically charged for thereby preventing dust or dirt particles in the air from being attracted to the screen, and a video projection television system which employs such an uncharged transmission-type screen.

2. Description of the Prior Art

Figure 18A:
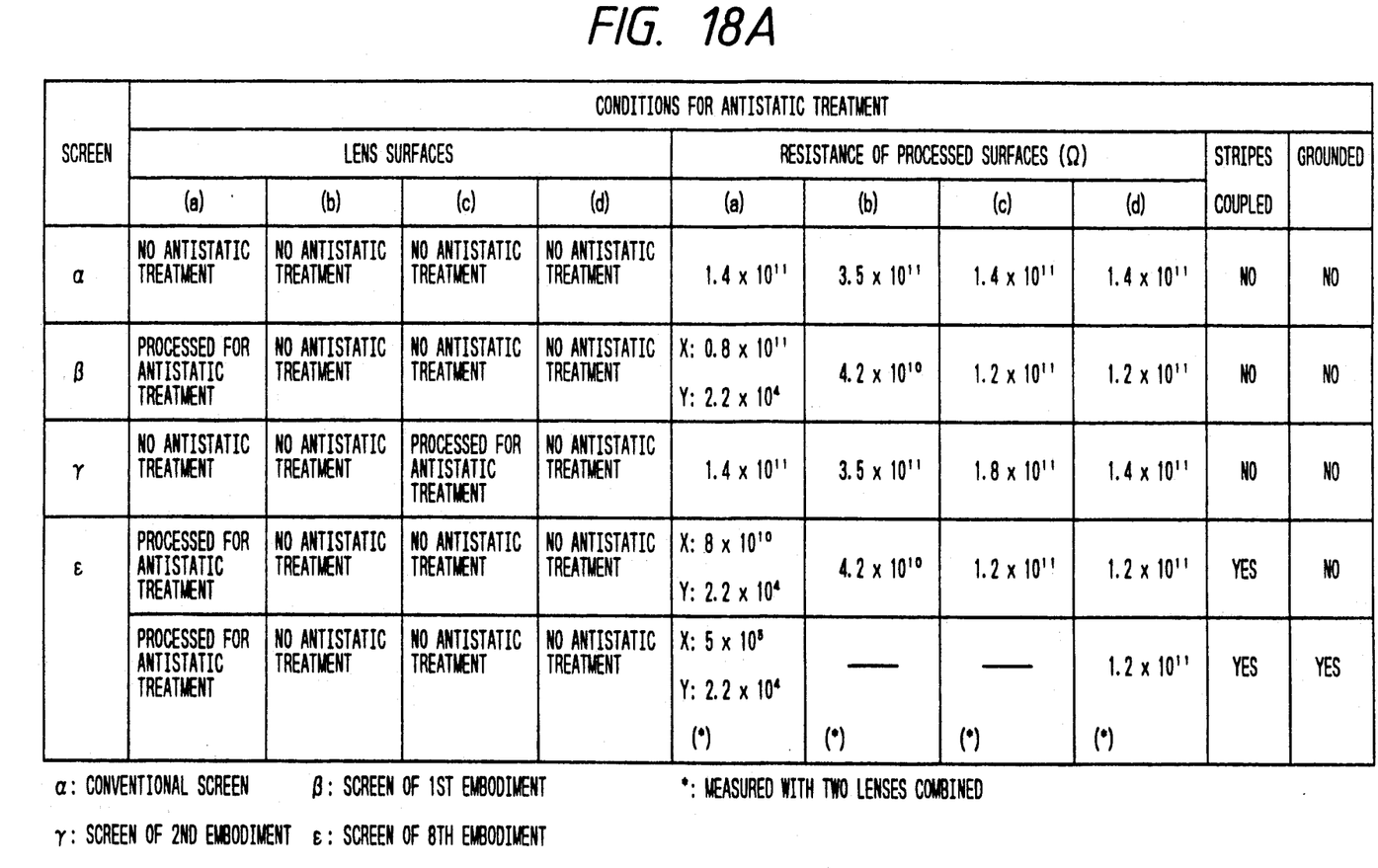
FIGS. 18A and 18B are tables of antistatic processes and electrostatic potentials of different screens.

One conventional transmission-type screen of plastic material for use in transmission-type video projection television is of a double-lens structure comprising a Fresnel lens and a lenticular lens which are combined with each other. The transmission-type screen has black stripes on its surfaces for absorbing and blocking rays of light. The black stripes are typically printed with black ink or coated with black paint. The black stripes of blank ink or paint present an electric resistance of $1.4 \times 10^{11}$ Ω on the exit-side surface (a) of the lenticular lens, an electric resistance of $3.5 \times 10^{11}$ Ω on the entrance-side surface (b) of the lenticular lens, an electric resistance of $1.4 \times 10^{11}$ Ω on the exit-side surface (c) of the Fresnel lens, and an electric resistance of $1.4 \times 10^{11}$ Ω on the exit-side surface (d) of the lenticular lens, an electric resistance of $1.4 \times 10^{11}$ Ω on the entrance-side surface of the lenticular lens, as shown in FIG. 18 in the row indicated at α. Since these surface electric resistances are very high, the screen surfaces can easily be triboelectrically charged up to an extremely high electrostatic potential. For example, when the exit-side surface (a) of the lenticular lens is rubbed, it is electrostatically charged up to 10 KV; and when the entrance-side surface (d) of the Fresnel lens is rubbed, it is electrostatically charged up to 30 KV. The electrostatically charged screen surfaces easily attract dust or dirt particles in the ambient air, and can be smeared very quickly.

When the dust or dirt deposit is wiped off the charged screen surfaces with a dust cloth, the other screen surfaces, which are opposite the charged screen surfaces, also become triboelectrically charged up to a high electrostatic potential.

In order to prevent the screen surfaces from being triboelectrically charged, it has been customary to use a surface-active agent as an antistatic agent which does not erode the plastic material.

However, surface-active agents have a short service life, and remain effective for only half through one year even when they are left unused. When dust or dirt deposits are wiped off surfaces that are coated with a surface-active agent, the surface-active agent is also gradually wiped away, and hence has a shorter service life.

The surface-active agent which is applied to the entire surfaces of a transmission-type screen of plastic material is selected to be transparent and highly transmission of light. Since the surface-active agent is heat-resistant only at low temperatures ranging from 60° to 80° C., it must be treated at a low temperature and does not last for a long time.

When deposited dust or dirt particles are wiped off the screen, the surface-active agent is also removed from the screen by the friction within a short period of time. Therefore, the screen tends to attract dust or dirt particles easily under electrostatic charges that are developed by triboelectricity. This in turn requires the screen to be wiped again to get rid of the attracted dust or dirt particles, resulting in more triboelectric attraction of dust or dirt particles.

SUMMARY OF THE INVENTION

It is an object of the present invention to provide a transmission-type screen which is highly resistant to being electrostatically charged.

Another object of the present invention is to provide a video projection television system which employs such a transmission-type screen.

According to the present invention, there is provided a transmission-type screen comprising a lens for transmitting rays of light therethrough, and an electrically conductive layer or a metal member mounted on a surface of the lens for preventing the surface from being electrostatically charged.

The lens may comprise a Fresnel lens and a lenticular lens which are positioned closely parallel to each other, the lenticular lens having a plurality of black stripes on an exit-side surface thereof for absorbing and blocking rays of light, the black stripes being made of an electrically conductive material having a surface resistance of $1 \times 10^9$ Ω or less.

The lens may comprise a Fresnel lens and a lenticular lens which are positioned closely parallel to each other, the lenticular lens having a plurality of parallel spaced grooves defined in an entrance-side surface thereof, and a plurality of electrically conductive layers disposed in the grooves, respectively, the electrically conductive layers being made of a material having a surface resistance of $1 \times 10^9$ Ω or less.

The lens may comprise a Fresnel lens and a lenticular lens which are positioned closely parallel to each other, the Fresnel lens having a plurality of axial steps on an exit-side surface thereof, and a plurality of electrically conductive layers attached to the axial steps, respectively, the electrically conductive layers being made of a material having a surface resistance of $1 \times 10^9$ Ω or less.

The lens may comprise a Fresnel lens and a lenticular lens which are positioned closely parallel to each other, the Fresnel lens having a plurality of parallel spaced grooves defined in an entrance-side surface thereof for increasing a vertical field of view, and a plurality of electrically conductive layers or metal wires disposed respectively in the grooves, the electrically conductive layers being made of a material having a surface resistance of $1 \times 10^9$ Ω or less.

The lens may comprise a Fresnel lens and a lenticular lens which are positioned closely parallel to each other, the Fresnel lens having electrically conductive layers disposed in a grid pattern on an entrance-side surface thereof, the electrically conductive layers being made of a material having a surface resistance of $1 \times 10^9$ Ω or less.

The lens may comprise a Fresnel lens and a lenticular lens which are positioned closely parallel to each other, the Fresnel lens having a grid-like meshwork of metal wires disposed on an entrance side surface thereof.

The lens may comprise a Fresnel lens and a lenticular lens which are positioned closely parallel to each other, the lenticular lens having a plurality of parallel spaced black stripes disposed on an exit-side surface thereof and a plurality of parallel spaced grooves defined in an entrance-side surface thereof, the lenticular lens further including a plurality of metal wires disposed respectively in the black stripes or the grooves and having partly exposed surfaces.

The lens may comprise a Fresnel lens and a lenticular lens which are positioned closely parallel to each other, the lenticular lens having a plurality of black, parallel spaced electrically conductive layers disposed on an exit-side surface thereof, and a plurality of black stripes disposed respectively on the electrically conductive layers.

The lens may comprise a Fresnel lens and an array of parallel optical fibers which are positioned closely parallel to each other, the optical fibers being bonded by adhesive layers each comprising a mixture of an adhesive and an electrically conductive material which is added at a proportion such that the mixture has a surface resistance of $1 \times 10^9 \Omega$ or less.

The lens may comprise a Fresnel lens and an array of parallel optical fibers which are positioned closely parallel to each other, the optical fibers being bonded by adhesive layers, and including electrically conductive layers disposed respectively on the adhesive layers, each of the electrically conductive layers being made of a material having a surface resistance of $1 \times 10^9 \Omega$ or less.

The lens may comprise a Fresnel lens and a lenticular lens which are positioned closely parallel to each other, the lenticular lens having a plurality of parallel spaced black stripes disposed on an exit-side surface thereof and an electrically conductive layer interconnecting the black stripes and extending along outer peripheral edges of the lenticular lens, the electrically conductive layer being made of a material having a surface resistance of $1 \times 10^9 \Omega$ or less.

The lens may comprise a Fresnel lens and a lenticular lens which are positioned closely parallel to each other, the lenticular lens having a plurality of parallel spaced black stripes disposed on an exit-side surface thereof and an electrically conductive layer interconnecting the black stripes and disposed over the exit-side surface, the electrically conductive layer being made of a material having a surface resistance of $1 \times 10^9 \Omega$ or less.

The lens may comprise a Fresnel lens and a lenticular lens which are positioned closely parallel to each other, the lenticular lens having a plurality of parallel spaced black stripes disposed on an exit-side surface thereof, further comprising a frame of an electrically conductive material or a metal surrounding outer peripheral edges of the Fresnel lens and the lenticular lens, the electrically conductive material having a surface resistance of $1 \times 10^9 \Omega$ or less.

The electrically conductive layer or the frame may be grounded by a ground wire.

The electrically conductive layer may be made of a mixture of one of a printing paste, a paint, and an adhesive and carbon whose proportion is selected such that the mixture has a surface resistance of $1 \times 10^9 \Omega$ or less, or a mixture of carbon and another electrically conductive material at proportions selected such that the mixture has a surface resistance of $1 \times 10^9 \Omega$ or less.

According to the present invention, there is also provided a video projection television system comprising a screen comprising a lens for transmitting rays of light therethrough, and an electrically conductive layer or a metal member mounted on a surface of the lens for preventing the surface from being electrostatically charged, and a projector for projecting an image onto the screen.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Like or corresponding parts are denoted by like or corresponding reference characters throughout views.

Figure 17:
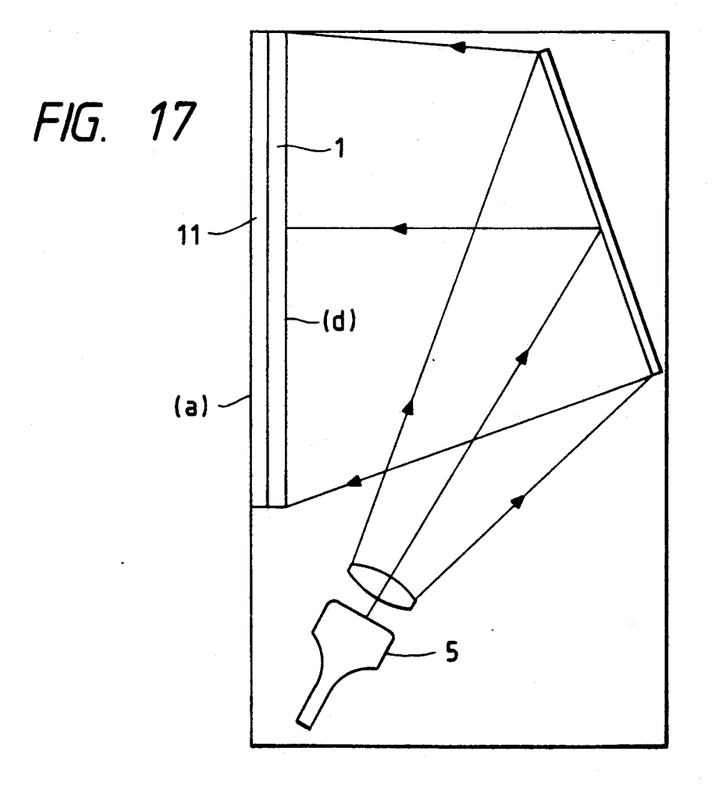
FIG. 17 is a schematic view of a transmission-type video projection television system.

A transmission-type screen according to the present invention is designed for use in an integral transmission-type video projection television system as shown in FIG. 17. As shown in FIG. 17, the transmission-type video projection television system has a projector 5 for projecting an image onto a transmission-type screen mounted in a front opening in a projection television housing.

A transmission-type screen according to a first embodiment of the present invention will be described below with reference to FIGS. 1 through 3.

Figure 1:
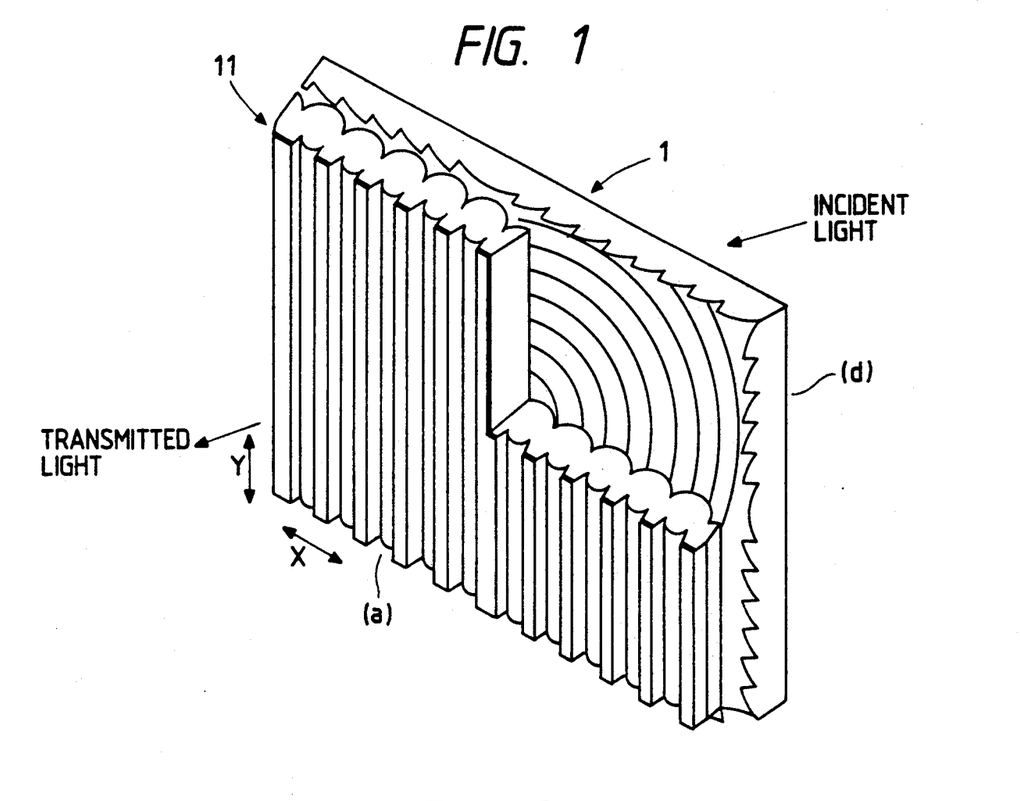
FIG. 1 is a fragmentary perspective view, partly cut away, of a transmission-type screen according to a first embodiment of the present invention.
Figure 2:
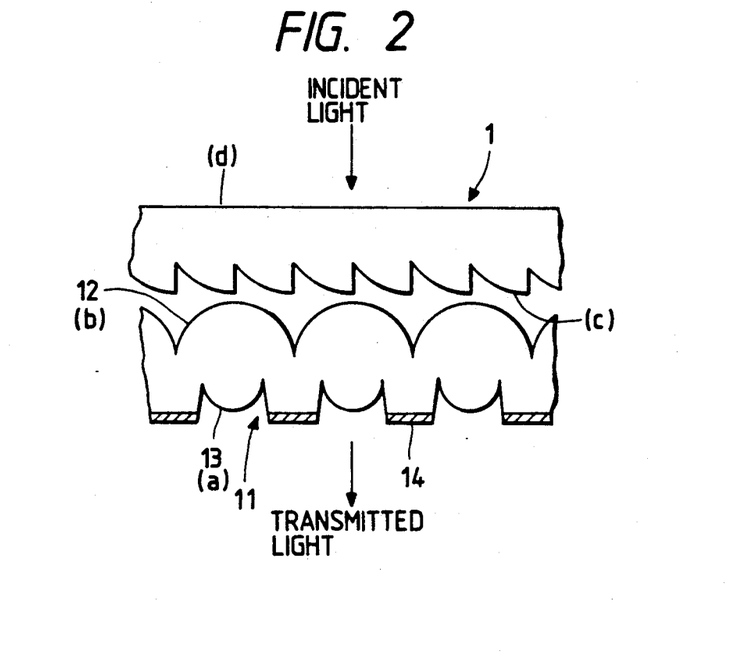
FIG. 2 is an enlarged fragmentary horizontal cross-sectional view of the transmission-type screen shown in FIG. 1.
Figure 3:
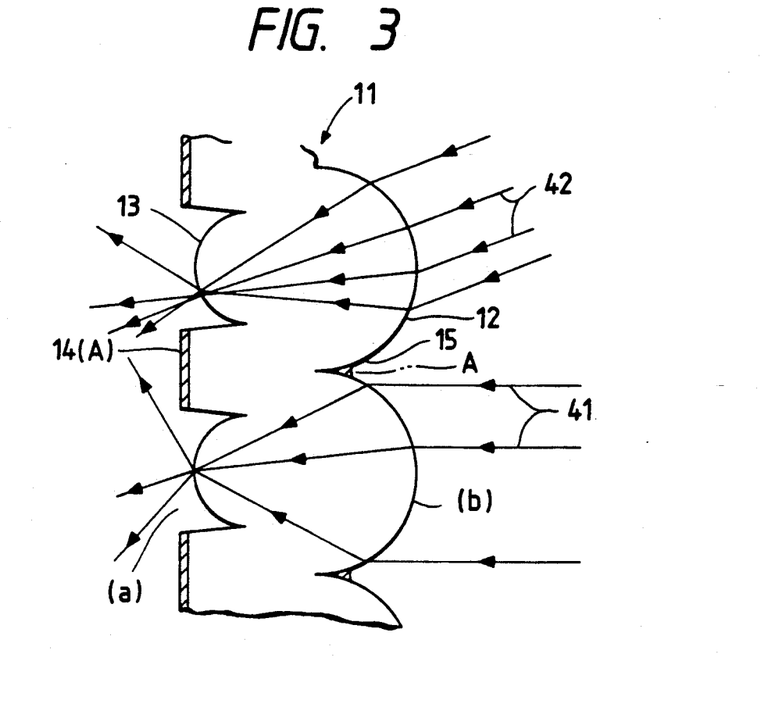
FIG. 3 is an enlarged fragmentary horizontal cross-sectional view of the transmission-type screen shown in FIG. 1.

The transmission-type screen shown in FIGS. 1 through 3 is of a double-lens structure comprising a circular Fresnel lens 1 and a lenticular lens 11 which are positioned closely to each other in parallel relationship.

The lenticular lens 11 has a plurality of spaced black stripes 14 (see FIGS. 2 and 3) printed on or otherwise applied to an exit-side surface 13 remote from the Fresnel lens 1. When rays 41 of light are incident perpendicularly to the lenticular lens 11 or rays 42 of light are incident obliquely to the lenticular lens 11, as shown in FIG. 3, they are focused by an entrance-side lens surface 12 onto the exit-side lens surface 13, and then are diverged by the exit-side lens surface 13 as they leave the lenticular lens 11. The black stripes 14 are positioned between the lens elements of the exit-side lens surface 13, and serve to absorb and block external light rays that are incident on the exit-side lens surface 13.

The exit-side surface 13 and the entrance-side surface 12 of the lenticular lens 11 will also be referred to as the exit-side surface (a) and the entrance-side surface (b), respectively. The Fresnel lens 1 also has an exit-side surface (c) which faces the entrance-side surface (b) of the lenticular lens 11 and an entrance-side surface (d).

When the transmission-type screen mounted in the transmission-type video projection television system is electrostatically charged, dust or dirt particles would be attached to the exit-side surface (a) of the lenticular lens 11 and the entrance-side surface (d) of the Fresnel lens 1. Since the entrance-side surface (d) of the Fresnel lens 1 is located within the system, any dust or dirt deposits could not be wiped off. When the exit-side surface (a) of the lenticular lens 11 is rubbed to wipe off dust or dirt particles, it would be triboelectrically charged up to an electrostatic potential of up to 10 KV, and at the same time the entrance-side surface (d) of the Fresnel lens 1 would also be triboelectrically charged up to an electrostatic potential of up to 10 KV. Therefore, both the exit-side surface (a) and the entrance-side surface (d) would attract dust or dirt particles when the exit-side surface (a) is rubbed.

According to the first embodiment of the present invention, the electric resistance of the exit-side surface (a) of the lenticular lens 11 is $1 \times 10^9 \Omega$ or less, so that the screen will not be electrostatically charged undesirably when rubbed to wipe off dust or dirt particles.

More specifically, each of the black stripes 14 is formed as an electrically conductive layer A of a material having a surface resistance of $1 \times 10^9 \Omega$ or less by printing, coating, evaporation, adhesive bonding, or the like, as shown in FIG. 3.

The surface resistances of the surfaces (a), (b), (c), (d) of the screen according to the first embodiment were measured in an experiment. The exit-side surface (a) was measured in both the directions indicated by the arrows X and Y (see FIG. 1). As shown in the row indicated by β in FIGS. 18A and 18B, the resistance of the exit-side surface (a) of the lenticular lens 11 was $0.8 \times 10^{11} \Omega$ in the X direction and $2.2 \times 10^4 \Omega$ in the Y direction, the resistance of the entrance-side surface (b) of the lenticular lens 11 was $0.42 \times 10^{11} \Omega$, the resistance of the exit-side surface (c) of the Fresnel lens 1 was $1.2 \times 10^{11} \Omega$, and the resistance of the entrance side surface (d) of the Fresnel lens 1 was $1.2 \times 10^{11} \Omega$. The resistance of the exit-side surface (a) of the lenticular lens 11 in the Y direction, in which electric conductivity appears, was much lower than the resistance thereof in the X direction.

When the exit-side surface (a) of the lenticular lens 11 was rubbed, the exit-side surface (a) and the entrance-side surface (d) of the Fresnel lens were triboelectrically charged to an electrostatic potential of 0 V, i.e., they were not electrostatically charged at all. This appears to be because when the exit-side surface (a) is rubbed, any electrostatic potential that is triboelectrically developed on the exit-side surface (a) is instantaneously removed by the electrically conductive black stripes 14. Therefore, no electrostatic charge is transferred to the entrance-side surface (d) of the Fresnel lens 1.

When the entrance-side surface (d) of the Fresnel lens 1 was rubbed, it was charged to an electrostatic potential of 8 Kv, but the exit-side surface (a) of the lenticular lens 11 was charged to an electrostatic potential of 0 V, i.e., was not electrostatically charged at all. The entrance-side surface (d) was charged onto to 8 KV because the originally developed electrostatic charge thereof was reduced by the electrically conductive black stripes 14 on the exit-side surface (a) of the lenticular lens 11.

Unlike the conventional antistatic agents such as surface-active agents, the electrically conductive black stripes 14 are not worn away by rubbing, and can be used semipermanently.

Figure 4:
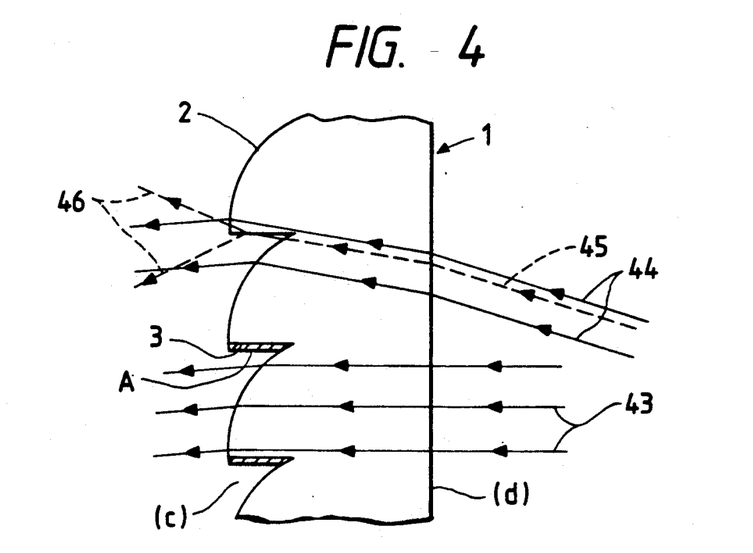
FIG. 4 is an enlarged fragmentary cross-sectional view of a transmission-type screen according to a second embodiment of the present invention.

FIG. 4 fragmentarily shows a transmission-type screen according to a second embodiment of the present invention. While only a circular Fresnel lens 1 is shown in FIG. 4, the screen also has a lenticular lens as shown in FIG. 1. According to the second embodiment, an electrically conductive layer A is attached to each axial step 3 on its exit-end surface 2 or (c).

When rays 43 of light are incident perpendicularly to the Fresnel lens 1 or rays 44 of light are incident obliquely to the Fresnel lens 1, they are bent by the Fresnel lens 1 and transmitted out of the exit-side surface (c) toward a focused point. An incident ray 45 of light is applied to an axial step 3 and divided thereby into rays 46 of light, one entering the step 3 and one reflected by the step 3. These rays 46 are not directed toward the focused point, and hence are not necessary. Therefore, each of the axial steps 3 may be utilized for other purpose, i.e., to support the electrically conductive layer A.

The electrically conductive layers A are made of a material having a surface resistance of $1 \times 10^9 \Omega$ or less and is attached to each axial step 3 by printing, coating, evaporation, adhesive bonding, or the like.

An experiment was conducted to measure the surface resistances of the surfaces (a), (b), (c), (d) of the screen according to the second embodiment. As shown in the row indicated by γ in FIGS. 18A and 18B, the resistance of the exit-side surface (c) of the Fresnel lens 1 was $1.8 \times 10^8 \Omega$ the resistance of the entrance-side surface (d) of the Fresnel lens 1 was $1.4 \times 10^{11} \Omega$, the resistance of the exit-side surface (a) of the lenticular lens 5 was $1.4 \times 10^{11} \Omega$, and the resistance of the entrance-side surface (b) of the lenticular lens was $3.5 \times 10^{11} \Omega$.

When the exit-side surface (a) of the lenticular lens was rubbed, the exit-side surface (a) and the entrance-side surface (d) of the Fresnel lens were triboelectrically charged to electrostatic potentials of 500 V and 250 V, respectively. Although these electrostatic potentials were not nil, they were much lower than those of the corresponding surfaces of the conventional transmission-type screen as indicated in the row in FIGS. 18A and 18B.

Figure 18B:
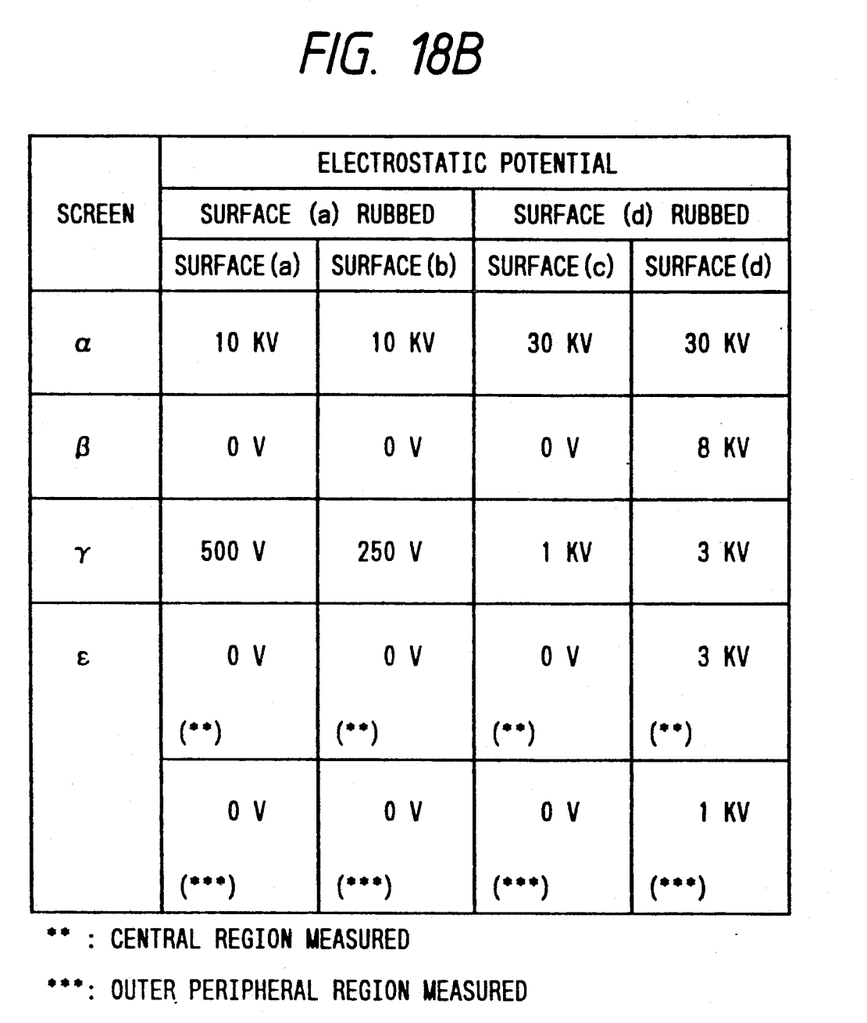
Figure 19:
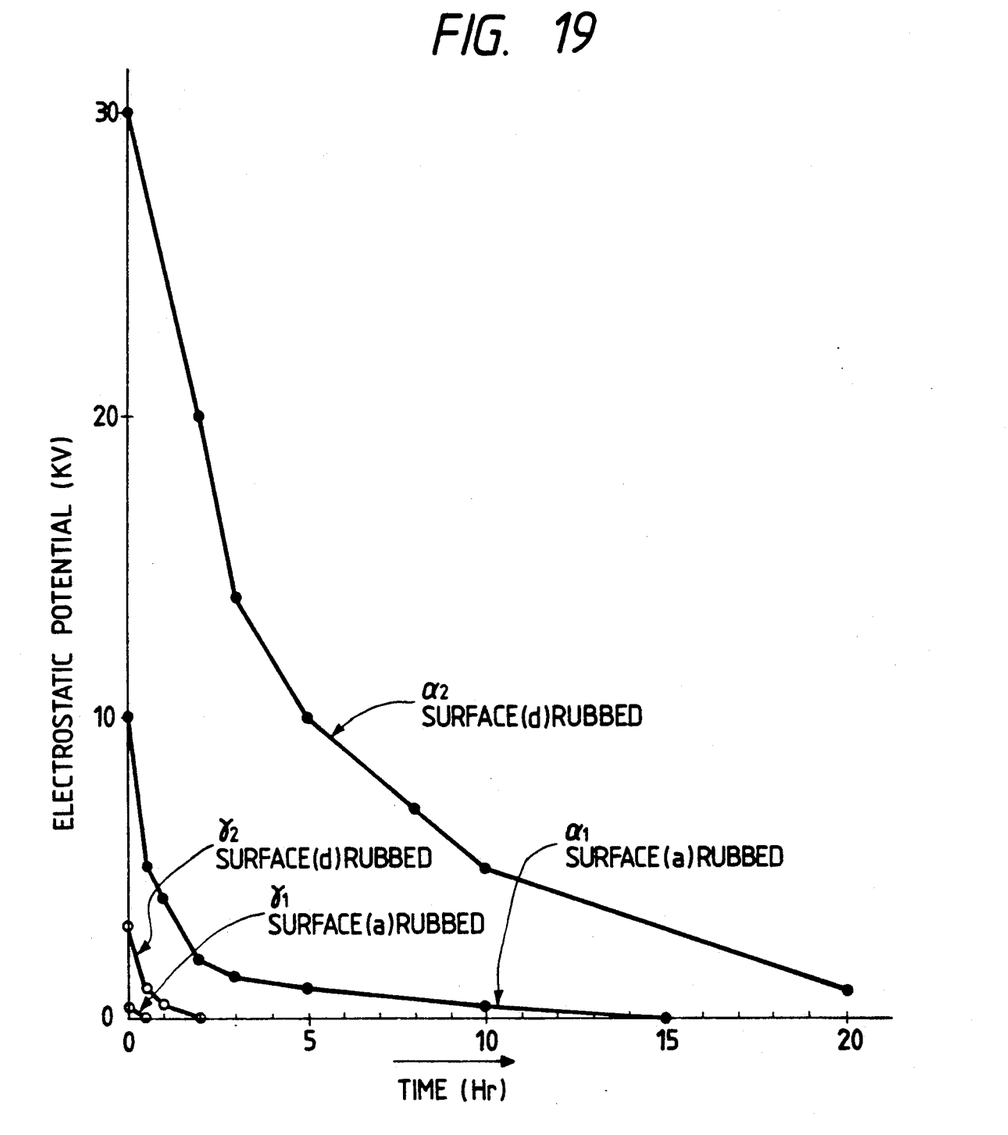
FIG. 19 is a graph showing electrostatic potentials of the different screens as they decrease with time.

The electrostatic potentials thus developed on the surfaces (a), (d) of the transmission-type screen as indicated in the row γ in FIGS. 18A and 18B disappear in a short period of time, as indicated by curves γ1, γ2 in FIG. 19, since they are much lower than those of the 15 corresponding surfaces of the conventional transmission-type screen as indicated in the row α in FIGS. 18A and 18B and also by curves α1, α2 in FIG. 19. Therefore, less dust or dirt particles are attracted to these surfaces (a), (d) of the screen according to the second embodiment.

When the exit-side surface (a) of the lenticular lens is rubbed, it may be charged up to an electrostatic potential of 10 KV as it has not antistatic or electrically conductive layer. However, since the resistance of the exit-side surface (c) of the Fresnel lens is $1.8 \times 10^8 \Omega$, the electrostatic potential developed on the exit-side surface (a) is instantaneously reduced, in about several tens of munites, as indicated by the curve γ1 in FIG. 19.

The electrostatic charge which was transferred to the entrance-side surface (d) of the Fresnel lens was 250 V, which was half 500 V of the exit-side surface (a), owing to the electrically conductive layers A on the axial steps 3 of the exit-side surface (c) of the Fresnel lens.

When the entrance-side surface (d) of the Fresnel lens was rubbed, it was charged to an electrostatic potential of 3 KV, but the exit-side surface (a) of the lenticular lens was charged to only an electrostatic potential of 1 KV. This also proves the effectiveness of the electrically conductive layers A on the exit-side surface (c) of the Fresnel lens.

According to a third embodiment of the present invention, as indicated by the imaginary lines in FIG. 4, an electrically conductive layer A of a material having a surface resistance of $1 \times 10^9 \Omega$ or less is applied in each of parallel spaced grooves 15 between adjacent parallel ridges or lens elements on the entrance-side surface 12 of the lenticular lens 11 by printing, coating, evaporation, adhesive bonding, or the like.

Figure 5A:
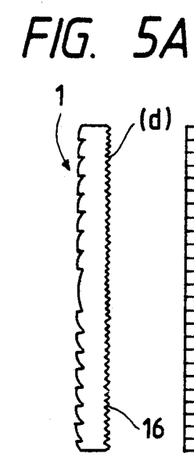
FIGS. 5A and 5B are fragmentary cross-sectional and rear elevational views, respectively, of a transmission-type screen according to a fourth embodiment of the present invention.
Figure 5B:
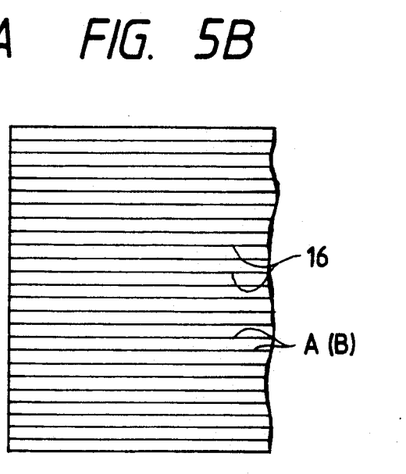

FIGS. 5A and 5B fragmentarily show a transmission-type screen according to a fourth embodiment of the present invention. In FIGS. 5A and 5B, the transmission-type screen includes a Fresnel lens 1 having a plurality of parallel spaced grooves 16 defined in its entrance-side surface (d) for increasing a vertical field of view. An electrically conductive layer A of a material having a surface resistance of $1 \times 10^9 \Omega$ or less is applied in each groove 16 by printing, coating, evaporation, adhesive bonding, or the like. The electrically conductive layers A are as effective to remove or reduce an electrostatic charge as those of the second and third embodiments described above. As an alternative, metal wires may be used in place of the electrically conductive layers A.

Figure 6A:
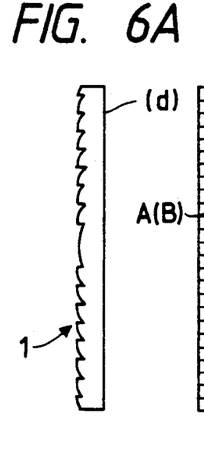
FIGS. 6A and 6B are fragmentary cross-sectional and rear elevational views, respectively, of a modification of the transmission-type screen shown in FIGS. 5A and 5B.
Figure 6B:
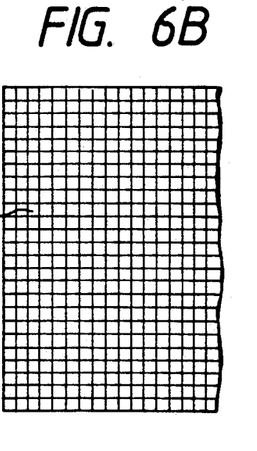

FIGS. 6A and 6B fragmentarily show a modification of the fourth embodiment. According to this modification, electrically conductive layers A of a material having a surface resistance of $1 \times 10^9 \Omega$ or less are applied in a grid pattern to the entrance-side surface (d) of a Fresnel lens 1.

Figure 7A:
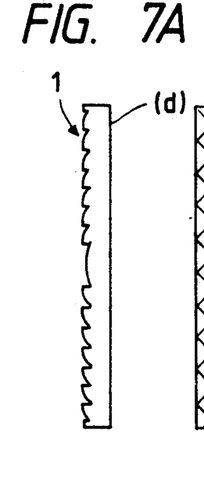
FIGS. 7A and 7B are fragmentary cross-sectional and rear elevational views, respectively, of another modification of the transmission-type screen shown in FIGS. 5A and 5B.
Figure 7B:
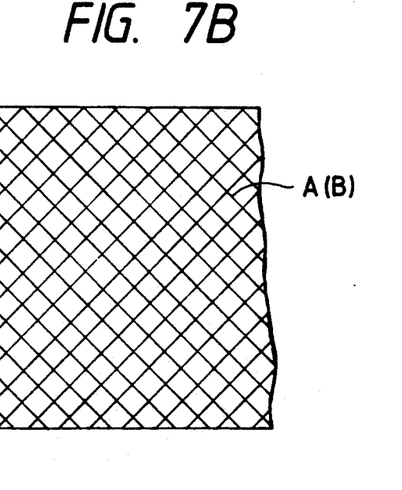

According to another modification shown in FIGS. 7A and 7B, electrically conductive layers A of a material having a surface resistance of $1 \times 10^9 \Omega$ or less are applied in an oblique grid pattern to the entrance-side surface (d) of a Fresnel lens 1.

When the entrance-side surface (d) of the Fresnel lens 1 in each of the above modifications was rubbed, it was charged to an electrostatic potential of about 0 V, i.e., was not electrostatically charged.

In FIGS. 6A, 6B and 7A, 7B, a black grid-like meshwork of metal wires B may be used instead of the electrically conductive layer A, the metal wires B being partly embedded in the entrance-side surface (d).

The grid pattern of electrically conductive layer A or the black grid-like meshwork of metal wires B absorbs and blocks incident rays of light, lowering the transmittance of light through the Fresnel lens 1. It is necessary that the width of the electrically conductive layer A or the metal wires B be selected such that the transmittance of light through the Fresnel lens of the modified screen will be 95% or more of that which is achieved before the grid pattern or grid-like meshwork is applied.

Figure 8:
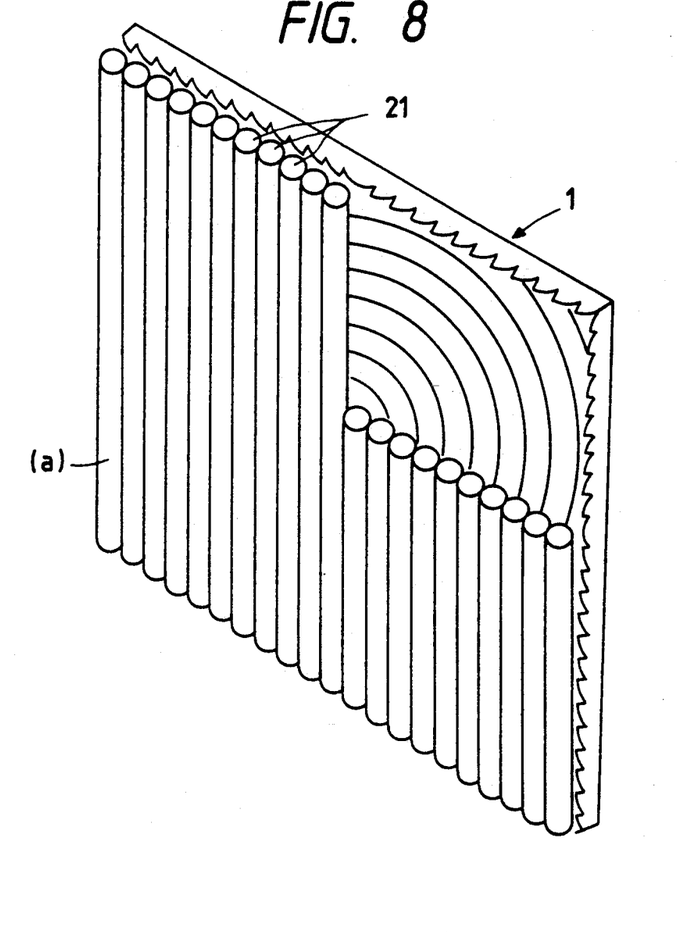
FIG. 8 is a fragmentary perspective view, partly cut away, of a transmission-type screen according to a fifth embodiment of the present invention.
Figure 9:
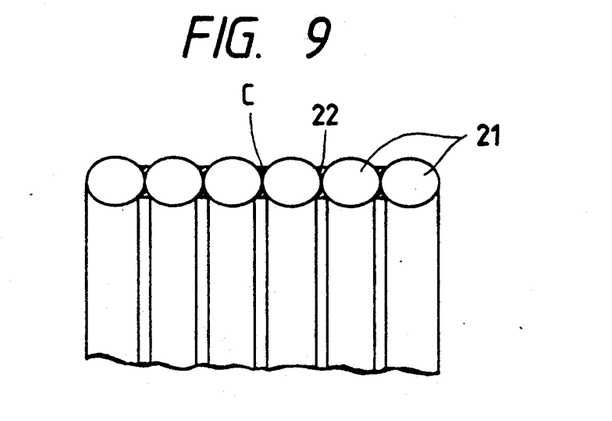
FIG. 9 is an enlarged fragmentary horizontal cross-sectional view of the transmission-type screen shown in FIG. 8.

FIGS. 8 and 9 show a transmission-type screen according to a fifth embodiment of the present invention. The transmission-type screen shown in FIGS. 8 and 9 comprises a Fresnel lens 1 and an array of parallel optical fibers 21, the Fresnel lens 1 and the optical fiber array being positioned closely parallel to each other. Grooves 22 defined between the optical fibers 21 are filled with adhesive layers C which bond the optical fibers 21 together. The adhesive layers or fillings C also serve as black stripes to absorb and block external light applied thereto.

The adhesive material is mixed with an electrically conductive material such that the resulting adhesive layers C have a surface resistance of $1 \times 10^9 \Omega$ or less, and then the mixture is applied as the adhesive layers C to bond the optical fibers 21.

Alternatively, after the optical fibers 21 are bonded together by the adhesive layers 21, an electrically conductive layer of a material having a surface resistance of $1 \times 10^9 \Omega$ or less is applied to the surface of each of the adhesive layers 21 by printing, coating, evaporation, adhesive bonding, or the like.

The transmission-type screen shown in FIGS. 8 and 9 is effective to prevent an electrostatic charge buildup when the exit-side surface (a) of the optical fiber array is rubbed, as with the second and third embodiments of the present invention.

Figure 10:
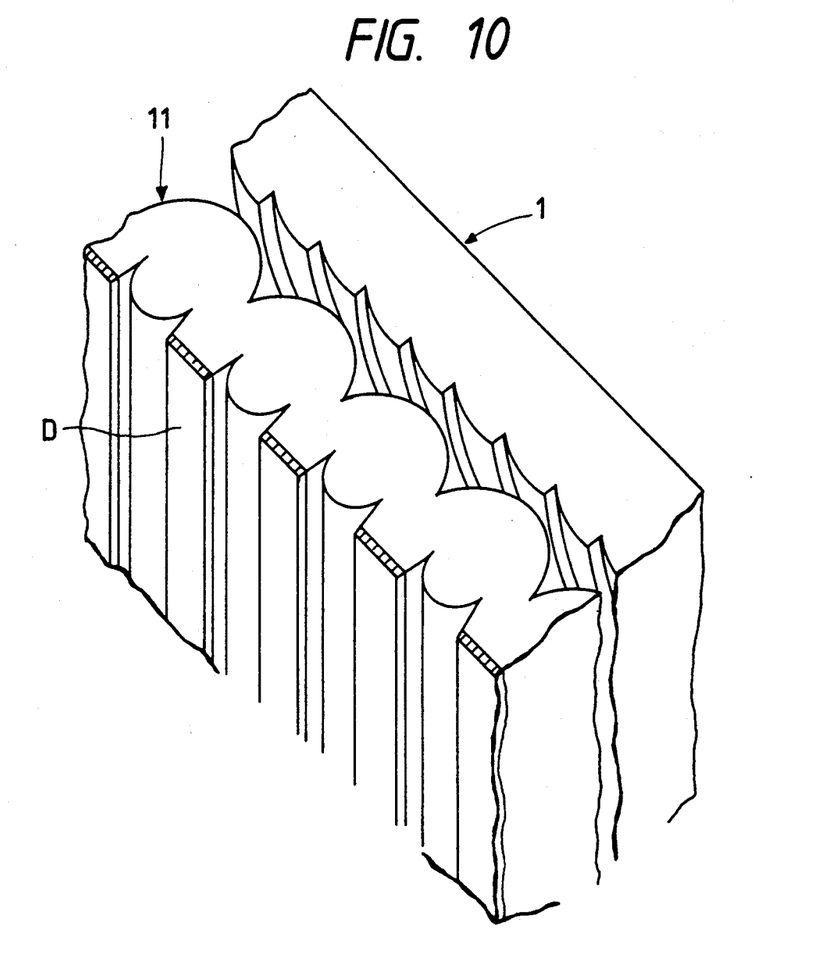
FIG. 10 is a fragmentary perspective view of a transmission-type screen according to a sixth embodiment of the present invention.

As shown in FIG. 10, a transmission-type screen according to a sixth embodiment of the present invention has parallel spaced electrically conductive layers D in the form of black foils or plates of silver, copper, aluminum, or the like. The electrically conductive layers D are embedded in or attached to the respective printed black stripes on the lenticular lens 11.

Figure 11:
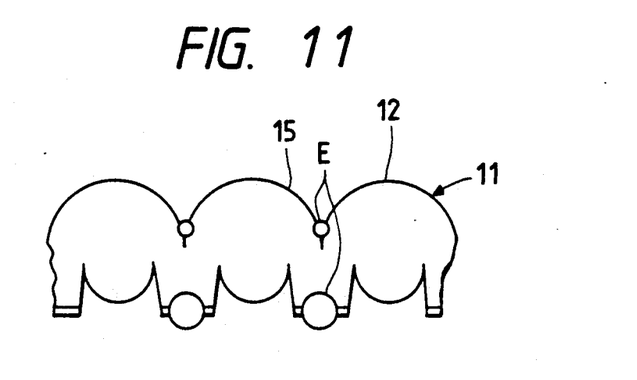
FIG. 11 is an enlarged fragmentary horizontal cross-sectional view of a transmission-type screen according to a seventh embodiment of the present invention.

FIG. 11 fragmentarily illustrates a lenticular lens 11 of a transmission-type screen according to a seventh embodiment of the present invention. The lenticular lens 11 includes metal wires E partly embedded in the respective printed black stripes of the lenticular lens 11 and thinner metal wires E placed in the respective grooves 15 in the entrance-side surface 12 of the lenticular lens 11. These metal wires E have partly exposed surfaces.

Figure 12:
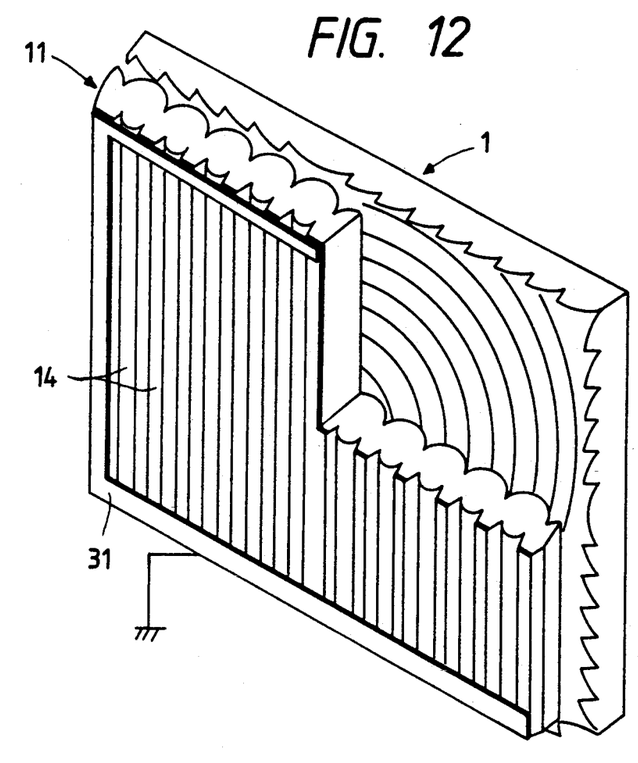
FIG. 12 is a fragmentary perspective view, partly cut away, of a transmission-type screen according to an eighth embodiment of the present invention.
Figure 13:
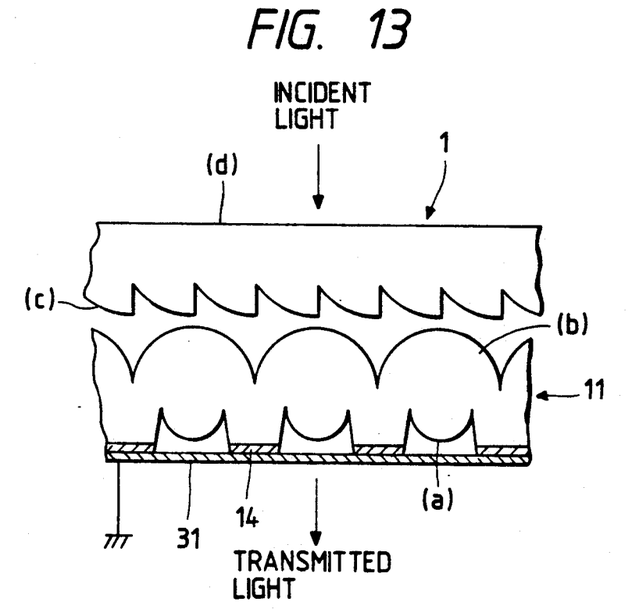
FIG. 13 is an enlarged fragmentary horizontal cross-sectional view of the transmission-type screen shown in FIG. 12.

FIGS. 12 and 13 show a transmission-type screen according to an eighth embodiment of the present invention. The transmission-type screen includes a lenticular lens 11 having a plurality of spaced parallel black stripes 14 each formed as an electrically conductive layer A of a material having a surface resistance of $1 \times 10^9 \Omega$ or less and attached to the exit-side surface by printing, coating, evaporation, adhesive bonding, or the like. The black stripes 14 are interconnected by a metal tape 31 extending along the outer peripheral edge of the lenticular lens 11. When the entrance-side surface (d) of the Fresnel lens 1 was rubbed, the surfaces (a), (b), (c) were not electrostatically charged, but the entrance side surface (d) was electrostatically charged to 3 KV at its central region and 1 KV at its outer peripheral region, as shown in the row indicated by $\epsilon$ in FIGS. 18A and 18B. These electrostatic potentials are much lower than the electrostatic potential of 8 KV developed on the entrance-side surface (d) of the screen as indicated by $\beta$, where the black stripes are not interconnected by any metal tape.

Figure 14:
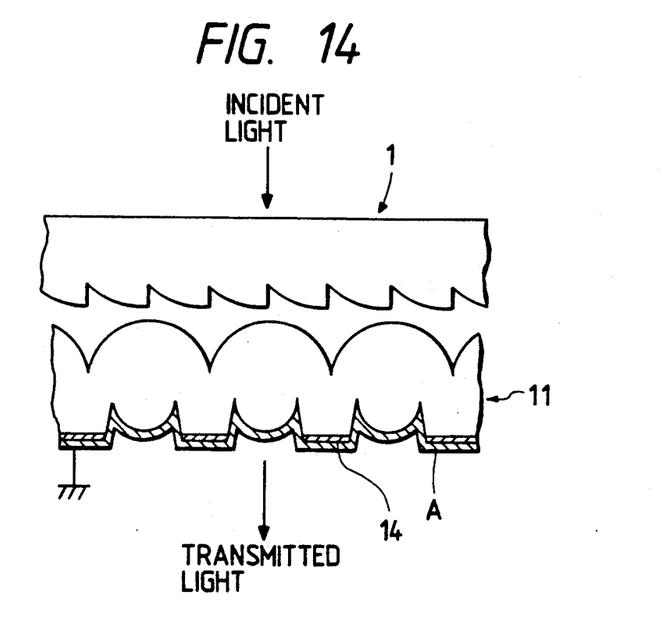
FIG. 14 is an enlarged fragmentary horizontal cross-sectional view of a transmission-type screen according to a ninth embodiment of the present invention.

FIG. 14 fragmentarily shows a transmission-type screen according to a ninth embodiment of the present invention. In FIG. 14, the black stripes 14 are interconnected by an electrically conductive layer A of a material having a surface resistance of $1 \times 10^9 \Omega$ or less and attached to the exit-side surface of the lenticular lens 11 by printing, coating, evaporation, adhesive bonding, or the like.

Figure 15:
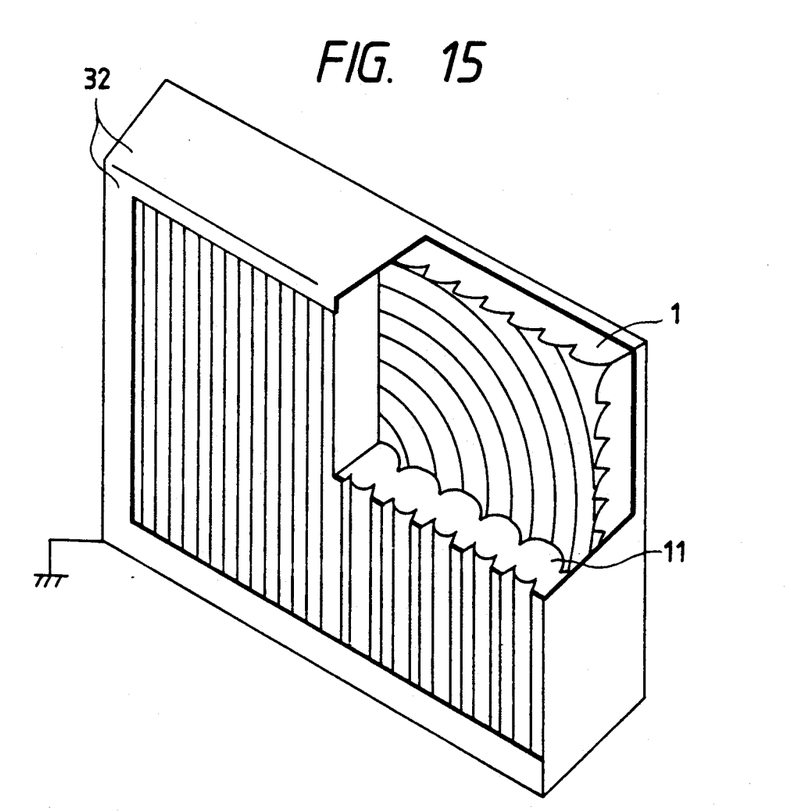
FIG. 15 is a fragmentary perspective view, partly cut away, of a transmission-type screen according to a tenth embodiment of the present invention.
Figure 16:
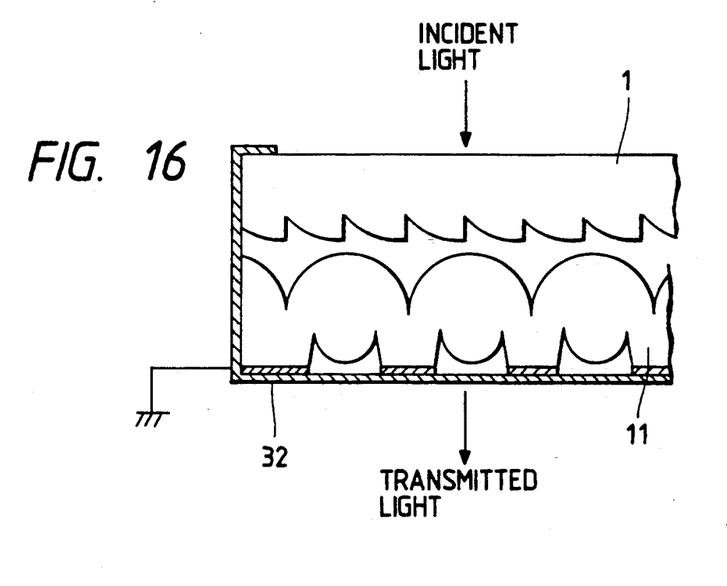
FIG. 16 is an enlarged fragmentary horizontal cross-sectional view of the transmission-type screen shown in FIG. 15.

According to a tenth embodiment shown in FIGS. 15 and 16, the entire peripheral edges of a transmission-type screen composed of a Fresnel lens 1 and a lenticular lens 11 are surrounded and held by a frame 32 of an electrically conductive material or metal which is kept in contact with the entire peripheral edges of the screen. The frame 32 has a portion contacting the black stripes 14 on the exit-side surface of the lenticular lens 11.

In the eighth through tenth embodiments, the electrically conductive layer A, the metal tape 31, and the frame 31 are grounded by a ground wire for better prevention of an electrostatic charge buildup and reduction of electrostatic potentials that are developed.

The material of the electrically conductive layer used in each of the above embodiments may be either a mixture of a printing paste, a paint, or an adhesive and carbon whose proportion is selected such that the mixture has a surface resistance of $1 \times 10^9 \Omega$ or less, or a mixture of carbon and another electrically conductive material such as copper, silver, or other metal at proportions selected such that the mixture has a surface resistance of $1 \times 10^9 \Omega$ or less.

In each of the above embodiments, the transmission-type screen is of a double-lens structure. However, the principles of the present invention are also applicable to a single-lens transmission-type screen comprising a single lens which has a Fresnel lens surface on an entrance side and a lenticular lens surface on an exit side. In such a single-lens transmission-type screen, one or both of the Fresnel and lenticular lens surfaces may be processed for antistatic treatment.

Similarly, the transmission-type screen according to the present invention may be composed of a combination of three or more lenses.

Furthermore, the antistatic treatment according to the present invention may be applied to a screen of a two-component reflection-type video projection television system which comprises a front projector for projecting an image onto the screen spaced from the projector so that the image reflected by the screen can be viewed by observers.

Although certain preferred embodiments of the present invention have been shown and described in detail, it should be understood that various changes and modifications may be made therein without departing from the scope of the appended claims.

What is claimed is:

1. A transmission-type screen comprising:
   a lenticular lens for transmitting rays of light therethrough; and
   an electrically conductive layer mounted on a surface of said lenticular lens for preventing said surface from being electrostatically charged.

2. A transmission-type screen comprising:
   a lens for transmitting rays of light therethrough;
   an electrically conductive layer mounted on a surface of said lens for preventing said surface from being electrostatically charged;
   wherein said lens comprises a Fresnel lens and a lenticular lens which are positioned closely parallel to each other, said electrically conductive layer mounted on said lenticular lens having a plurality of black stripes on an exit-side surface thereof for absorbing and blocking rays of light, said black stripes being made of a material having a surface resistance of $1 \times 10^9 \Omega$ or less.

3. A transmission-type screen according to claim 1, wherein said lens comprises a Fresnel lens and a lenticular lens which are positioned closely parallel to each other, said lenticular lens having a plurality of parallel spaced grooves defined in an entranceside surface thereof, and a plurality of electrically conductive layers disposed in said grooves, respectively, said electrically conductive layers being made of a material having a surface resistance of $1 \times 10^9 \Omega$ or less.

4. A transmission-type screen according to claim 1, wherein said lens comprises a Fresnel lens and a lenticular lens which are positioned closely parallel to each other, said Fresnel lens having a plurality of axial steps on an exit-side surface thereof, and a plurality of electrically conductive layers attached to said axial steps, respectively, said electrically conductive layers being made of a material having a surface resistance of $1 \times 10^9 \Omega$ or less.

5. A transmission-type screen according to claim 1, wherein said lens comprises a Fresnel lens and a lenticular lens which are positioned closely parallel to each other, said Fresnel lens having a plurality of parallel spaced grooves defined in an entrance side surface thereof for increasing a vertical field of view, and a plurality of electrically conductive layers or metal wires disposed respectively in said grooves, said electrically conductive layers being made of a material having a surface resistance of $1 \times 10^9 \Omega$ or less.

6. A transmission-type screen according to claim 1, wherein said lens comprises a Fresnel lens and a lenticular lens which are positioned closely parallel to each other, said Fresnel lens having electrically conductive layers disposed in a grid pattern on an entrance-side surface thereof, said electrically conductive layers being made of a material having a surface resistance of $1 \times 10^9 \Omega$ or less.

7. A transmission-type screen according to claim 1, wherein said lens comprises a Fresnel lens and a lenticular lens which are positioned closely parallel to each other, said Fresnel lens having a grid-like meshwork of metal wires disposed on an entrance-side surface thereof.

8. A transmission-type screen according to claim 1, wherein said lens comprises a Fresnel lens and a lenticular lens which are positioned closely parallel to each other, said lenticular lens having a plurality of parallel spaced black stripes disposed on an exit-side surface thereof and a plurality of parallel spaced grooves defined in an entrance-side surface thereof, said lenticular lens further including a plurality of metal wires disposed respectively in said black stripes or said grooves and having partly exposed surfaces.

9. A transmission-type screen according to claim 1, wherein said lens comprises a Fresnel lens and a lenticular lens which are positioned closely parallel to each other, said lenticular lens having a plurality of black, parallel spaced electrically conductive layers disposed on an exit-side surface thereof, and a plurality of black stripes disposed respectively on said electrically conductive layers.

10. A transmission-type screen according to claim 1, wherein said lens comprises a Fresnel lens and an array of parallel optical fibers which are positioned closely parallel to each other, said optical fibers being bonded by adhesive layers each comprising a mixture of an adhesive and an electrically conductive material which is added at a proportion such that said mixture has a surface resistance of $1 \times 10^9 \Omega$ or less.

11. A transmission-type screen according to claim 1, wherein said lens comprises a Fresnel lens and an array of parallel optical fibers which are positioned closely parallel to each other, said optical fibers being bonded by adhesive layers, and including electrically conductive layers disposed respectively on said adhesive layers, each of said electrically conductive layers being made of a material having a surface resistance of $1 \times 10^9 \Omega$ or less.

12. A transmission-type screen according to claim 1, wherein said lens comprises a Fresnel lens and a lenticular lens which are positioned closely parallel to each other, said lenticular lens having a plurality of parallel spaced black stripes disposed on an exit-side surface thereof and an electrically conductive layer interconnecting said black stripes and extending along outer peripheral edges of said lenticular lens, said electrically conductive layer being made of a material having a surface resistance of $1 \times 10^9 \Omega$ or less.

13. A transmission-type screen according to claim 1, wherein said lens comprises a Fresnel lens and a lenticular lens which are positioned closely parallel to each other, said lenticular lens having a plurality of parallel spaced black stripes disposed on an exit-side surface thereof and an electrically conductive layer interconnecting said black stripes and disposed over said exit-side surface, said electrically conductive layer being made of a material having a surface resistance of $1 \times 10^9 \Omega$ or less.

14. A transmission-type screen according to claim 1, wherein said lens comprises a Fresnel lens and a lenticular lens which are positioned closely parallel to each other, said lenticular lens having a plurality of parallel spaced black stripes disposed on an exit-side surface thereof, further comprising a frame of an electrically conductive material or a metal surrounding outer peripheral edges of said Fresnel lens and said lenticular lens, said electrically conductive material having a surface resistance of $1 \times 10^9 \Omega$ or less.

15. A transmission-type screen according to claim 12 further comprising a ground wire by which said electrically conductive layer or said frame is grounded.

16. A transmission-type screen according to claim 1, wherein said electrically conductive layer is made of a mixture of one of a printing paste, a paint, and an adhesive and carbon whose proportion is selected such that said mixture has a surface resistance of $1 \times 10^9 \Omega$ or less, or a mixture of carbon and another electrically conductive material at proportions selected such that said mixture has a surface resistance of $1 \times 10^9 \Omega$ or less.

17. A video projection television system comprising:
a screen comprising a lenticular lens for transmitting rays of light therethrough, and an electrically conductive layer mounted on a surface of said lens for preventing said surface from being electrostatically charged; and
a projector for projecting an image onto said screen.

18. A transmission-type screen according to claim 13, further comprising a ground wire by which said electrically conductive layer or said frame is grounded.

19. A transmission-type screen according to claim 14, further comprising a ground wire by which said electrically conductive layer or said frame is grounded.

* * * * *